United States Patent [19]
Gordy

[11] 3,772,003
[45] Nov. 13, 1973

[54] PROCESS FOR THE ELECTROLYTIC RECOVERY OF LEAD, SILVER AND ZINC FROM THEIR ORE

[76] Inventor: John Gordy, 1011 Dennis Crescent East, British Columbia, Canada

[22] Filed: Feb. 7, 1972

[21] Appl. No.: 224,109

Related U.S. Application Data

[63] Continuation-in-part of Ser. Nos. 70,105, Sept. 8, 1970, abandoned, and Ser. No. 14,172, Feb. 25, 1970, abandoned, and Ser. No. 558,419, June 17, 1966, abandoned.

[52] U.S. Cl............... 75/101, 75/109, 204/111, 204/117, 204/118
[51] Int. Cl........ C22b 3/00, C22d 1/12, C22d 1/22
[58] Field of Search................... 75/101, 109; 204/111, 117–118

[56] References Cited
UNITED STATES PATENTS
2,673,179  3/1954  Duncan et al. ............. 204/118
1,284,910  11/1918  Larson ........................ 204/117

Primary Examiner—John H. Mack
Assistant Examiner—R. L. Andrews
Attorney—Richard K. Stevens et al.

[57] ABSTRACT

A method of extracting any or all of zinc, silver and lead from their mixed sulfide ores, and ore concentrates. The method comprises electrolysing a slurry of the finely ground ore in the presence of a catalyst in the anode chamber or compartment of an electrolytic cell, said catalyst comprising an ion complex of a cuprous halide (CuX), in aqueous hydrogen halide. Chloride is the preferred halide. The ion complex of cuprous halide under the influence of an applied electric current initiates a reaction generating an oxidizing species which attacks and oxidizes the solids in the anode chamber or compartment. Cupric halide ($CuX_2$), preferably cupric chloride, is also added for the purpose of suppressing evolution of hydrogen sulfide, particularly where iron and zinc sulphides are present. An ion-selective permeable membrane is used to separate the anode compartment, containing ore slurry and reactants, from the cathode compartment.

22 Claims, 3 Drawing Figures

PROCESS FOR THE ELECTROLYTIC RECOVERY OF LEAD, SILVER AND ZINC FROM THEIR ORE

RELATED CASES

This is a Continuation-In-Part of my United States application Ser. No. 70,105 filed Sept. 8, 1970, entitled "Process for the Electrolytic Recovery of Lead, Silver and Zinc from their Ores" now abandoned, my U.S. application Ser. No. 14,172 filed Feb. 25, 1970, entitled "Process for the Electrolytic Recovery of Copper from its Ores" now abandoned; and of my application Ser. No. 558,419 filed June 17th, 1966, now abandoned and entitled "Process for the Electrolytic Recovery of Copper from its Ores."

The present invention relates to the extraction and recovery of zinc, silver, and lead from ores thereof, and more specifically, to a novel electrolytic ore leaching method which may be used to recover one or more of zinc, silver and lead from ores or concentrates. The invention finds special applicability to mixed sulfide ore concentrates containing zinc, silver and lead, and copper.

Numerous methods have been described in the prior art for recovering metals from their native ores. Prior workers have shown that mineral ores may be broken down and the valuable constituents therein recovered by methods involving techniques such as thermal or electrolytic oxidation, or reduction, chemical extraction, flotation and so forth. These procedures have been used successfully when the ore being processed possesses relatively few metallic values to be recovered and is of relativey uniform chemical composition. However, there is a need for a more efficient method for use with refractory ores or mineral concentrates, and which allows more manageable control of pollutants.

The present invention therefore provides a method of extracting metals chosen from the group consisting of zinc, silver and lead from ores containing one or more of those metals, comprising the steps of a. electrolyzing an aqueous slurry of the finely ground ore in the presence of a catalyst in the anode chamber of an electrolytic cell having an anode chamber and a cathode chamber separated by a partitioning means for retention of ore particles, metal ions and metal complex ions in the anode compartment, said catalyst comprising an ion complex of a copper halide in excess hydrogen halide, said hydrogen halide being present in sufficient concentration to induce complex ion formation, and copper ions being present in the anode compartment in sufficient concentration to suppress the evolution of hydrogen sulfide, b. dewatering the electrolyzed solid slurry to obtain a filtrate and a solid residue, treating the solid residue with a reagent which dissolves silver halide, producing a soluble silver complex ion in solution, in the case where silver is present in the ore, c. treating the solid residue containing insoluble lead compounds with a strong base to produce a filtrate containing soluble plumbate ion ($PbO_2^-$) in the case where lead is present in the ore; and leaving a solid residue containing silica and other residual materials.

In one embodiment the ion complex in step (a) comprises cuprous halide (CuX), together with sufficient cupric halide ($CuX_2$) to suppress the evolution of hydrogen sulfide.

In another embodiment the present invention provides such a process comprising treating the electrolyzed solid slurry from step (a) with aqueous ammonia, aqueous thiosulfate solution or aqueous cyanide solution to produce the respective soluble silver ion complex, in the case where silver is present in the ore. The thiosulfate may be an alkali metal thiosulfate such as sodium thiosulfate. The cyanide may be an alkali metal cyanide such as sodium or potassium cyanide. In another embodiment the present invention provides such a process wherein aqueous ammonia is added in step (b) and wherein the residue from step (b) containing lead hydroxide is treated with a strong base to produce a filtrate containing soluble plumbate ion in the case where the ore contains lead.

In another aspect, the present invention provides such a process wherein the strong base in step (c) is an alkali metal hydroxide such as sodium hydroxide, or a strongly alkaline amine such as diethylamine tetramine.

In a preferred embodiment an electric current is passed through the solution of cuprous halide complex and aqueous hydrogen halide in the anode compartment for a suitable induction period before any ore is added, whereby to form a reactive oxidizing agent. This is for the purpose of enhancing early generation of the oxidizing species which attacks the solids in the anode compartment. 15 to 20 minutes has been found to be a suitable induction time in pilot plant operation. If this induction period is omitted the subsequent dissolution reaction will be less efficient. The induction time will normally be in the range of 5 to 30 minutes.

The present invention further comprises separating the solution from step (b) and treating it with copper metal to precipitate metallic silver.

In another embodiment the present invention comprises treating the filtrate from step (c) with carbon dioxide to precipitate lead carbonate ($PbCO_3$), separating the precipitate and heating it to produce lead oxide, and heating the oxide to produce lead. Preferably the pH in step (b) on addition of ammonia is in the range of 8 to 10, and the pH in step (c) on addition of strong base is in the range of 12 to 14.

The present invention further comprises recyling the filtrate from step (b) containing any electrolyzed zinc in the form of zinc ions, into the cathode compartment and depositing the zinc as zinc metal.

The hydrogen halide will preferably be hydrogen chloride, and the copper halide will preferably be at least predominantly copper chloride. The partitioning means will normally be a porus membrane preferably one of sintered ceramic.

Preferably, the concentration of hydrogen halide in the cuprous halide complex solution is at least 3N, and most preferably the complex solution contains from about 0.1 to 0.6 moles of cuprous chloride per liter of solution and from about three to about six moles HCl per liter of solution.

The aqueous cuprous chloride - hydrochloric acid complex formed herein is referred to as chlorocuprous acid in standard chemical texts, such as in Treadwell & Hall - "Inorganic Chemistray"; and in Kirk & Oppenheimer - "Encyclopedia of Chemical Technology".

These and other aspects of the present invention will become apparent to those skilled in the art from the following detailed description and drawings. In the drawings, which accompany this application, FIG. 1 represents a schematic cross-sectional view of an electrolytic cell apparatus which may be used in the practice of the present invention;

In general terms, the present invention involves a novel electrolytic ore treating process which comprises the steps of (1) subjecting a mineral ore which contains metallic values to anodic electrolysis in an electrolytic cell having an anode chamber and a cathode chamber separated by a porous membrane in the presence of an aqueous solution of cuprous halide complex and an acid halide along with cupric halide in some cases, and (2) subsequently recovering the metal values from said treated ore. The chloride is the preferred halide.

More specifically, I have found that the metal values contained in numberous complex mineral cores may be rendered more readily recoverable if the ore is first subject to an electrolytic anodic leaching treatment in the presence of an aqueous solution of cuprous halide complex ion, hydrogen halide, (and supric halide in some cases) before being subject to a conventional recovery procedure such as electrolysis, differential floatation, gravity separation (sink-float), and/or amalgamation. The present anodic treatment when carried out in an environment of aqueous cuprous halide-hydrogen halide complex serves to break down the refractory ore mixture and render the metal values contained therein more readily available for subsequent ecovwry. The anode liquor is filtered and transferred to the cathode compartment for the plating out of metal values dissolved and contained therein. The desired concentration of cuprous chloride-hydrogen chloride complex is maintained by the addition of cuprous chloride and hydrochloric acid as needed.

Cuprous halides such as cuprous chloride are insoluble in water, but will form a complex ion in aqueous hydrogen chloride as follows:

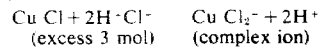

$$Cu\ Cl + 2H^-Cl^- \quad Cu\ Cl_2^- + 2H^+$$
(excess 3 mol) (complex ion)

Figure 1:
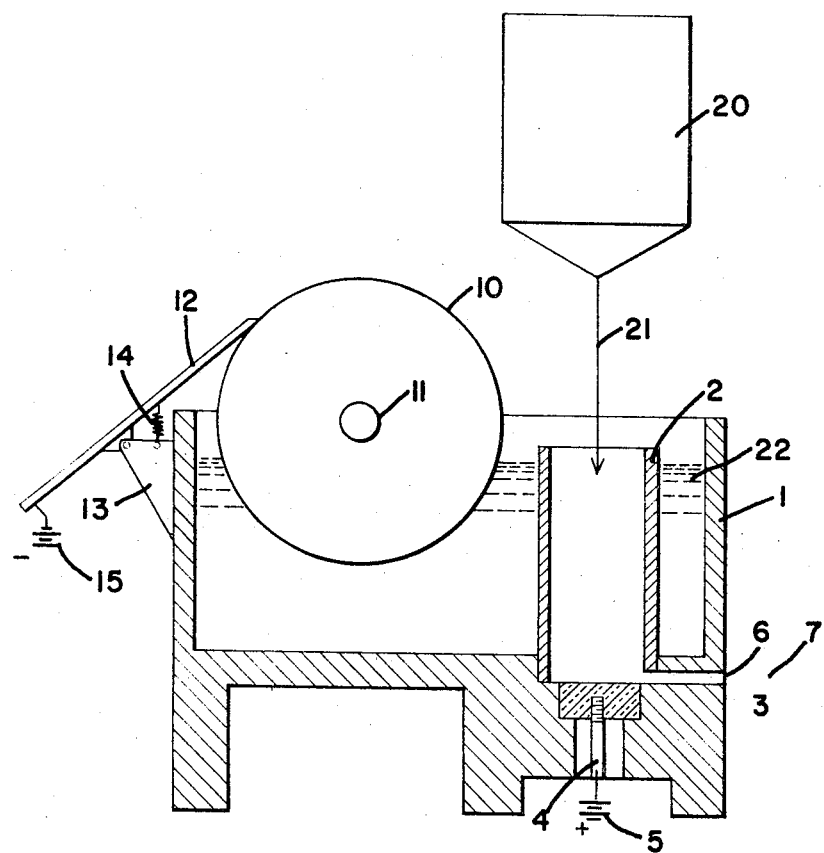

One apparatus used in the practice of my present invention as shown in FIG. 1 broadly comprised an anode chamber having a porous wall and adapted to receive cuprous chloride, hydrochloric acid, water and ore to be treated; and a cathode chamber substantially surrounding said anode chamber and filled with an electrolyte comprising aqueous hydrogen chloride solution. The chambers are separated by a porous membrane which allows the flow of current but prevents the flow of metal ions, metal complex ions and ore particles.

The present anodic electrolysis is preferably carried out using a direct current voltage which may vary from about 2.8 to 5 volts. Preferable current densities used in my process vary from about 30 to 100 amperes per square foot of effective anode area.

The ion-selective permeable membrane may be fabricated from a porous material such as ceramic porcelain having very fine pores. The membrane is importnat for the retention of ore particles, metal ions and metal complex ions in the anode compartment. It is important to maintain a high concentration of complex ions in the anode compartment since this accelerates the rate of dissolution of metal from its ores. It appears that the pores should be less than 35 microns in size. For example, larger pore sizes may permit appreciable amounts of ore to pass through the membrane. The partitioning means, which will normally comprise a porous material is outlined above, may be any system which effectively separates the anode chamber from the cathode chamber, with respect to the retention of ore, metal ions, and metal complex ions in the anode compartment. It is important to avoid the migration into the cathode chamber, of the oxidizing species generated by the passage of electric current through the solution containing the cuprous halide complex.

The ore density in the anode compartment should be kept as high as possible and preferably in the range of 50 to 80 percent by weight. A preferred ore density is 60 percent by weight. The tank fittings, pipes and other apparatus should be formed of acid-resistant material, such as glass fiber reinforced polyester plastic, polyvinyl chloride plastic, or the like. Of course the revolving cathode is not essential and any convenient form of cathode and anode may be employed.

The cuprous halide complex ion used in the practice of my present invention may be obtained by combining a cuprous halide, such as cuprous chloride, cuprous bromide, or cuprous iodide with an aqueous solution of the corresponding hydrogen halide, i.e., HCl, HBr, or HI. Preferably, a cuprous halide solution used in my invention contains from about 0.1 to 0.6 moles of cuprous halide salt per litre of aqueous solution and from about three to six moles of hydrogen halide per litre of aqueous solution. The concentration of this solution is continuously maintained in the anode chamber by addition of either acid or salt as is required. It is believed that the present cuprous halide complex ion possesses the general formula:

$$CuX_2^{-1}$$ 

wherein X represents chlorine, bromine, or iodine.

Figure 2:
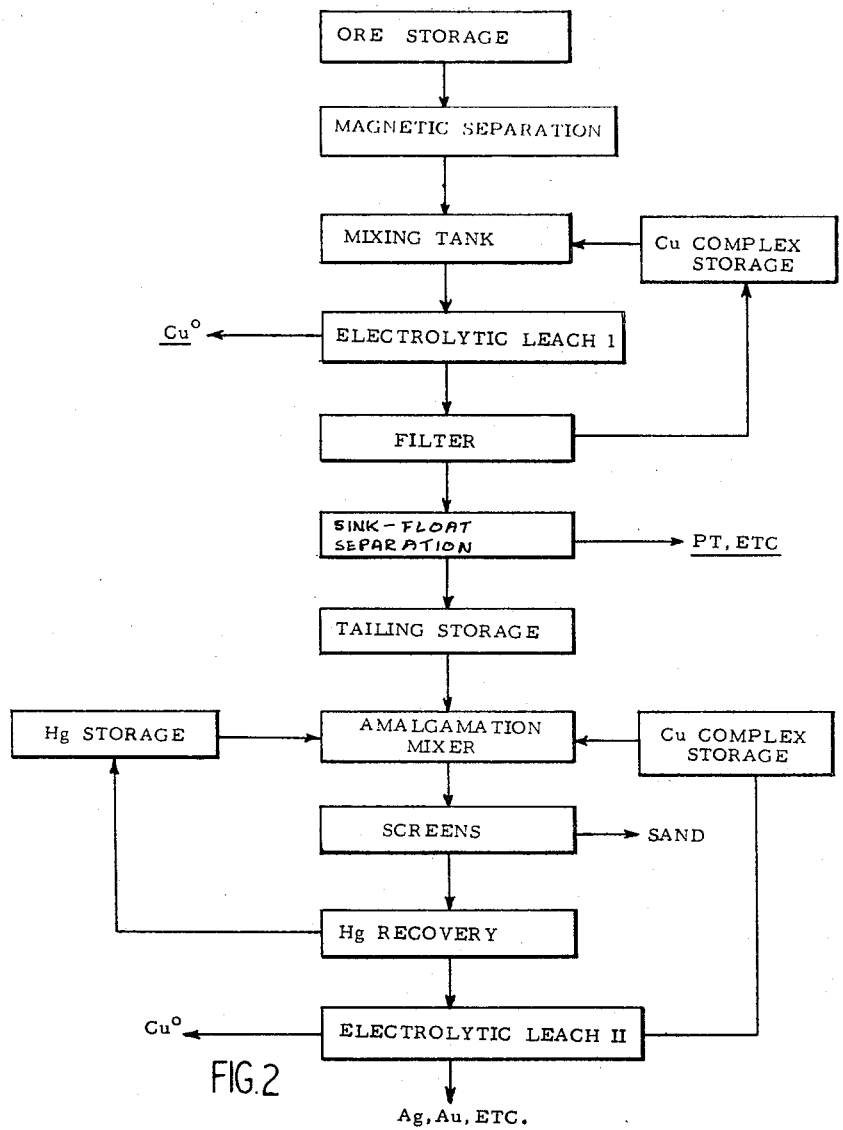
FIG. 2 is a block flow diagram which illustrates the use of one aspect of the present electrolytic treatment process in conjunction with conventional metal value recovery procedures.

The procedure generally outlined in FIG. 2 is an overall processing scheme which utilizes the novel anodic treatment step which is basic to one aspect of the present invention. It is to be understood that the above recovery scheme may be modified or cut short any any point so as to fulfill the requirements for the processing of varying types of ores.

Figure 3:
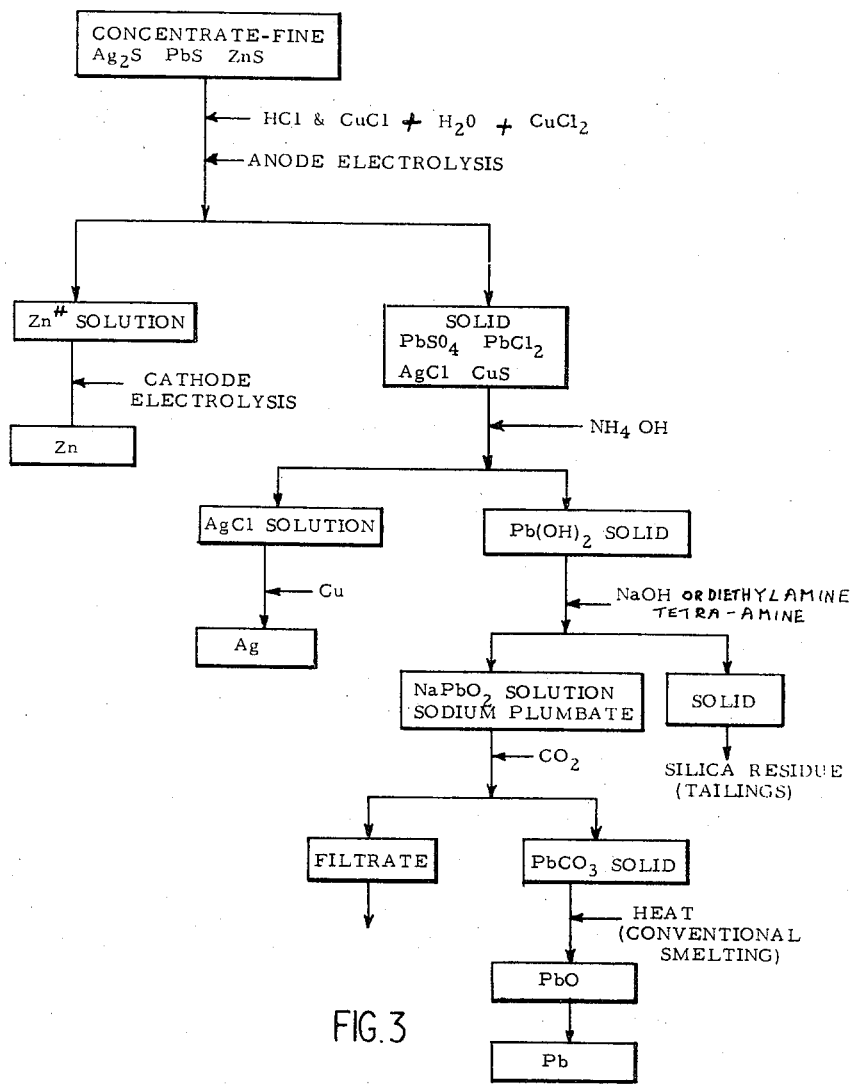
FIG. 3 is a block flow diagram which illustrates steps in a typical extraction process, in accordance with the present invention for the recovery of the three metals of principal interest in the specification; namely, zinc, silver and lead.

One broad aspect of this invention relates to the recovery of one or more of zinc, silver and lead from its ores. In particular, the invention relates to the extraction of those metals from mixed sulfides, preferably in the form of an ore concentrate. The process for the method of the extraction of zinc, silver and lead from a mixed sulfide ore is shown in general terms in FIG. 3 which is a block flow sheet.

In accordance with this aspect of the invention, the finely divided ore containing silver, lead and/or zinc, particularly in the form of their sulfides, is introduced into the anode compartment of an electrolytic cell. The anode and cathode compartments are separated by an ion-selective permeable membrane. This membrane is suitably formed from ceramic or the like material having the desired pore characteristics, as previously discussed. The finely divided ore is maintained in suspension in the slectrolyte solution by conventional agitation means, such as aeration. The anode electrolyte solution will consist of an aqueous solution of hydrochloric acid and cuprous chloride complex ion to which has been added additional copper ion. The cuprous chloride dissolves in the hydrochloric acid and is considered to form the cuprous chloride complex ion as follows:

$$CuCl + H^+ + Cl^- \longrightarrow [CuCl_2]^- + H^+$$
Solid / Aqueous form HCl / Complex ion in Solution The addition of excess copper chloride salt is usually necessary in order to suppress the possible evolution of hydrogen sulfide gas ($H_2S$). This additional copper salt will preferably take the form of cupric chloride as this effects considerable savings in the quantities of materials used. The excess copper ion appears to react with the hydrogen sulfide which would normally be evolved in the anode compartment upon addition of the ore and forms an insoluble copper sulfide precipitate. The use of cupric chloride ($CuCl_2$) obviously will greatly reduce the amount of copper salt needed for this function since the valency of its copper is twice as high as the valency of the copper in cuprous chloride. One determining factor is the requirement that there be present an excess of copper ion over the amount required to react with any generated sulfide ion.

An equivalent amount of cuprous chloride could be added but cuprous chloride salt is more expensive. Also, twice as much cuprous salt as cupric salt would be required to react with the liberated sulfide ions, e.g.:

$CuCl_2 \rightarrow Cu^{++} + 2 Cl^-$ (cupric ion)
$Cu^{++} + H_2S \rightarrow CuS + H^+$
$CuCl + H^+ + Cl^- \rightarrow [CuCl_2]^- + H^+$
$2[CuCl_2]^- + H_2S \rightarrow Cu_2S + 4Cl^- + 2H^+$ In actual practice, it is convenient to obtain sufficient copper ion by adding copper concentrate rather than cupric chloride and operating the cell as a copper cell until the desired copper concentration is reached. Then the silver, lead, zinc ore concentrate can be added and the plant run as a silver, lead, zinc plant. The sulfide chemistry of silver, lead, zinc and iron are as follows:

zinc sulfide and iron sulfide dissolve directly in the six Molar HCl acid solution yielding zinc, or ferrous ion and hydrogen sulfide gas $$ZnS + 2H^+ + Cl^- \longrightarrow Zn^{++} + \frac{H_2S}{gas}\uparrow + Cl^-$$

$$FeS + 2H^+ + Cl^- \longrightarrow Fe^{++} + \frac{H_2S}{gas}\uparrow + Cl^-$$

If there is insufficient copper ion to react with all of the generated hydrogen sulfide gas as follows:

$$Cu^{++} + H_2S \rightarrow CuS + 2H^+$$

the hydrogen sulfide gas will escape into the atmosphere causing the undesirable effects. As is well known, hydrogen sulfide gas is highly poisonous and even in extremely small concentrations it has a very offensive odor. In addition the loss of the hydrogen sulfide gas would represent a waste of valuable sulfur and hydrogen ion (acid).

The copper ion also appears to be involved in the conversion of the lead sulfide to lead chloride and lead sulfate, and silver sulfide to silver chloride during electrolysis. A possible mechanism may be shown as follows:

$PbS + Cu^{++} \rightarrow CuS + Pb^{++}$
then $Pb^{++} + 2Cl^- \rightarrow PbCl_2$
$Pb^{++} + SO_4^{--} \rightarrow PbSO_4$
$Ag_2S + Cu^{++} \rightarrow CuS + 2Ag^+$
$Ag^+ + Cl^- \rightarrow AgCl$ During the electrolysis reaction the electrolytic current will be adjusted in a manner consistent with high output of the cell, with care being taken to avoid the evolution of hydrogen sulfide, a polluting noxious gas. It has been found useful to apply approximately 40 to 60 amps per square foot of anode area.

In essence the electric energy through the catalyst preferentially oxidizes the sulfide ion attached to the copper sulfide librating copper ion which in turn reacts with more of the lead sulfide liberating lead ion which immediately reacts with chloride ion from the acid to form insoluble lead chloride which accumulates in the anode chamber. Some lead sulfate is also formed as a portion of the sulfide ion is converted to sulfate ion. Silver sulfide reacts similarly with copper ion yielding insoluble silver chloride.

At the end of a given kilowatt hour power consumption, the lead, silver, zinc and iron sulfides are converted to the following compounds and ions:
- lead sulfide forms lead chloride and lead sulfate
- silver sulfide forms silver chloride
- zinc sulfide forms soluble zinc ion
- ferrous sulfide forms soluble ferrous ion As lead chloride, lead sulfate and silver chloride are insoluble in acid solution, they end up in the anode residue while zinc and iron dissolve in the hydrochloric acid solution.

It will be seen that the present invention provides a method of obtaining pure zinc, silver and lead metals from ores or concentrates thereof, by an electrolytic method. The method appears to utilize copper ion in the presence of chloride as a converting agent for the conversion of silver and lead to their respective chlorides. Since the copper ion is regenerated during the electrolytic process, it may be considered to serve as a catalyst when seen in the light of the overall process.

EXAMPLE I

A more detailed understanding of my present invention may be obtained by referring to FIG. 1 which represents a schematic sectional diagram of an electrolytic apparatus which was effectively used in the practice of my present invention. The apparatus is contained in a tank (1) which was fabricated from acid-resistant reinforced plastic material. Located in the tank 1 is an anode chamber 2 which is an ion-selective permeable membrane of porous ceramic. The porcelain material which was used here was a sintered ceramic clay material having pores of the order of five microns in size. This material was obtained from Coors Porcelain Company. The thickness was about ⅜ inch, but is not considered critical. The anode chamber 2 is located over an anode member 3 which was fabricated from graphite carbon. The ratio of the volume of the anode chamber to the volume of the cathode chamber in this apparatus was about 1 to 10. The anode 3 is connected by means of electrical conduit 4 to a source of direct current 5 generally indicated as the anode bearing a positive charge, indicated by plus (+) sign.

The anode chamber 2 is provided with an outlet 6 which may be used to expel spent solutions and slurries in the direction indicated by the arrow 7.

Also located in the tank 1 is a cylindrical cathode member 10. Cathode member 10 is fabricated from an electro-conductive substance such as copper and may be conveniently covered with a thin foil of the same metal being extracted. The cylinder 10 rotates on axis 11 and is in contact with scraper member 12 which serves to remove accumulated material from the surface thereof. The scraper member 12 is pivotally mounted to the tank 1 by means of mounting 13. Furthermore, the scraper member 12 is maintained in constant frictional engagement with the cathode wheel 10 by means of spring 14. The scraper member 12 is provided with an electrical connection 15 which is attached to a source of direct current and bears a negative polarity as indicated by the minus (−) sign.

Located above anode chamber 2 is storage tank 20 which provides a source of mineral ore slurry and cuprous chloride complex ion in aqueous solution. The ore slurry and solution enters the anode chamber 2 by means of conduit 21. The tank 1 when in operation is filled with electrolyte 22. Initially this electrolyte preferably comprises a dilute solution of aqueous hydrogen halide.

In operation of the electrolytic device shown in FIG. 1, a mixture of cuprous halide complex solution and ore material is placed in anode chamber 2. This slurry of ore and cuprous halide complex solution is admitted to the anode chamber 2 by means of conduit 21 leading from tank 20. The tank 1 is then filled with an electrolyte which comprised a dilute aqueous solution of hydrochloric acid. A potential derived from a direct current source of electricity was placed across anode connection 5 and the cathode connection 15. This potential varied from about three to eight volts. The cathode cylinder 10 is then set in revolving motion (by means not shown) whereupon metal (in its reduced form) deposits upon the surface of the cathode cylinder 10 as anode solution was transferred to the cathode compartment, and further complex solution was added to the anode compartment and electrolysis was continued. The metal, such as copper, as it is deposited upon the rotating cylinder 10, is scraped from the surface thereof by means of scraping member 12. This material may then be advantageously collected in a container located below scraper member 12, but not shown herein.

The mineral ores treated in accordance with the practice of my present invention may comprise sulfide ores, which contain zinc, silver, lead, iron, copper, sulfur and various amounts of precious metals such as gold, and platinum. Typically, the ores treated in accordance with my present invetnion may be chalcocite ($Cu_2S$), chalcopyrite ($CuFeS_2$), covellite ($CuS$), and bornite ($Cu_3FeS_4$), native copper ores, carbonate ores or oxide ores. In addition to sulfide type ores, the present invention may be used to treat placer mining concentrates which may contain other metals.

Since it is desired to separate these additional metals from the ore, the process schematically defined in FIG. 2 was employed.

EXAMPLE 2

Reference to FIG. 2 shows a series of boxes, each of which indicate a material storage or processing point.

When the process defined in FIG. 2 was used in a series of runs, a sample of placer concentrate containing silver and gold was moved from the ore storage point to a magnetic separation point where magnetic impurities were removed. The material then moved to a mixing tank wherein the ore was combined with 0.05 to about 0.1 pounds of cuprous chloride with 500 ml. of 6 Molar HCl. This slurry was then conducted to an electrolytic leach apparatus such as, for example, one as described in FIG. 1. At this point any copper which may be present was plated out at the cathode by first electrolyzing the ore slurry in the anode compartment under agitation, followed by transfer of pregnant anode solution to the cathode compartment, after filtration. The liquid and solid material which accumulates at the bottom of the anode chamber was then subjected to a filtration wherein the solution containing cuprous chloride complex ion was returned to a cuprous chloride complex ion solution storage tank.

The filtered solids were then subjected to a sink-float process which results in separation of the heavier metals such as silver and gold in t the sink product. The sink product was then subjected to an amalgamation mixer. The float product was discarded. Leading into the amalgamation mixer were sources of mercury and cuprous chloride complex ion solution. Generally, it was found that at this point from about 0.02 to about 0.05 pounds of mercury were added per pound of incoming ore. Also from about 0.05 to 0.1 pounds of cuprous chloride with 500 ml. 6 Molar HCl solution was added to the amalgamation mixer per pound of incoming ore.

From the amalgamation mixer the material then passed to a screening step wherein waste material was removed as screen undersize. Then, the screen oversize material was passed to a mercury recovery step to recover mercury which was returned to the mercury storage point. The product then was subjected to a second electrolytic leach step similar to the first, and which used apparatus generally described in FIG. 1. From this step, any residual copper was electrolytically dissolved and valuable metals such as silver, gold and so forth were recovered as anode slimes from the bottom of anode leach chamber and these could be further refined.

EXAMPLE 3

A sample of high grade silver concentrate, assaying 1000 oz of silver per ton of ore, and prepared by the British Columbia Institute of Technology from a sample of ore received from the United Keno Hill Mines, Yukon, Canada, was placed in the anode cup in an apparatus generally as defined in FIG. 1. Approximately one pound of concentrate was added along with approximately 500 ml of cuprous chloride complex solution which contained 25 gms of cuprous chloride and 250 ml of concentrated HCL in 250 ml of water. The cathode compartment was filled with a solution of HCL which contained 500 ml of HCL in 500 ml of water, and 25 gms of cupric chloride salt was also added to the cathode compartment. The purpose of adding the cupric chloride salt is to prevent the evolution of hydrogen gas during electrolysis. The preferential deposition of copper metal also aids in improving current efficiency. The current was turned on and a current of 10 amperes was passed through the cell for two hours. The reaction proceded with the oxidation of the silver sulfide ore in the anode compartment and deposition of copper upon the cathode cylinders.

At the end of the two hours, the anode residue was filtered, washed and leached with $NH_4OH$ to dissolve the silver chloride. The silver chloride was reprecipitated from the ammonia solution with nitric acid, filtered, dried and weighed. 18.5 gms of silver chloride was recovered giving over 90 percent recovery of the silver.

EXAMPLE 4

The method of example 3 was carried out in much the same manner with the exception that approximately 500 ml of cuprous iodide complex solution was used containing approximately 30 gms of cuprous iodide dissolved in an aqueous solution containing 250 ml of water and 250 ml of concentrated hydroiodic acid (HI). The resulting silver iodide was found to be rleatively insoluble in ammonium hydroxide solution, necessitating the removal of silver iodide by sodium thiosulfate solution. A method was devised in which the silver iodide could be complexed and metallic silver recovered by electrowinning. As the silver iodide was difficult to handle and the cost of iodides higher, this embodiment was less attractive economically.

EXAMPLE 5

A typical high quality silver, lead and zinc concentrate emanating from the United Keno Mines in Yukon, Canada, was found to contain the following:
compounds of lead — (as lead sulfide, PbS) 66 percent
compounds of zinc — (as zinc sulfide, ZnS) 14 percent
compound of iron — (as iron sulfide, FeS) 8 percent
compounds of silica — 10 percent
compounds of silver — (as silver sulfide, $Ag_2S$) 450 oz/ton Fifty pounds of this material was finely ground and was introduced into the anode compartment of an electrolytic cell. The electrolytic cell consisted of a tank constructed of glass fiber reinforced polyester with polyvinyl chloride pipes and fittings. The finely divided concentrate was kept in suspension by bubbling air. The cell solution consisted of a mixture of six normal hydrochloric acid, cuprous chloride and cupric chloride. Since there was no naturally occurring copper in the sample, a sufficient amount of cupric chloride had to be added to the ore concentrate to suppress the generation of $H_2S$. The electrolyzing current was maintained at a rate of approximately 45 amps per square foot of anode area. The zinc sulfide was dissolved in the anode compartment and formed zinc ions in the anode solution. After electrolysis, the suspended solids in the anode compartment contained $PbSO_4$, $PbCl_2$, AgCl, elemental sulfur, and minor amounts of precipitated CuS, all of which are insoluble in the anode compartment solution. The solid tailings were washed into a slurry pump and was then filtered resulting in a filtrate solution containing zinc ions and a residue containing insoluble metal compounds. The filtrate containing the zinc ions was recycled again into the anode compartment and electrolyzed after the addition of fresh ore concentrate. This was done in order to raise the concentration of zinc ion in the solution. The zinc-enriched solution was then refiltered and pumped to a cathode solution storage tank. The cathode compartment was supplied the zinc-enriched solution. During cathodic electrolysis metallic zinc is deposited in the cathode compartment, from which it may be recovered.

The residue, containing the insoluble metal compounds, was treated with ammonium hydroxide at a pH of about 9. This treatment resulted in the solution of the silver chloride which was formed in the anode compartment. The silver chloride formed a soluble complex ion with the ammonium hydroxide and was removed by filtration from the remaining solid and recorded as a filtrate. This filtrate was treated with copper which resulted in the deposition of metallic silver. The solid, remaining after treatment with the ammonium hydroxide, and containing lead hydroxide, was then treated with a stronger base, sodium hydroxide at a pH of about 13.5, to produce a solid residue containing silica and other waste material and a filtrate which contained lead in solution as sodium plumbate. Treatment of this filtrate with carbon dioxide gas resulted in precipitation of the lead as lead carbonate. Metallic lead was obtained from the precipitate by conventional smelting procedures involving the use of heat and passing through a lead oxide stage to metallic lead. The overall recovery of metallic zinc, silver and lead was of the order of 95 percent based on the concentration of these metals in the ore concentrate feed.

I claim:

1. A method of extracting metals chosen from the group consisting of zinc, silver and lead from ores containing one or more of those metals, comprising the steps of
   a. electrolyzing an aqueous slurry of the finely ground ore in the presence of a catalyst in the anode chamber of an electrolytic cell having an anode chamber and a cathode chamber separated by a partitioning means for retention of ore particles, metal ions and metal complex ions in the anode compartment, said catalyst comprising an ion complex of a copper halide in excess hydrogen halide, said hydrogen halide being present in sufficient concentration to induce complex formation, and copper ions being present in the anode compartment in sufficient concentration to suppress the evolution of hydrogen sulfide,
   b. dewatering the electrolyzed solid slurry to obtain a filtrate and a solid residue, treating the solid residue with a reagent which dissolves silver halide, producing a soluble silver complex ion in solution, in the case where silver is present in the ore,
   c. treating the solid residue containing insoluble lead compounds with a strong base to produce a filtrate containing soluble plumbate ion ($PbO_2^-$) in the case where lead is present in the ore; and leaving a solid residue containing silica and other residual materials.

2. A method as in claim 1 comprising treating the electrolyzed solid slurry from step (a) with aqueous ammonia, aqueous thiosulfate solution or aqueous cyanide solution to produce the respective soluble silver ion complex, in the case where silver is present in the ore.

3. A method as in claim 2 wherein aqueous ammonia is added in step (b) and wherein the residue from step (b) containing lead hydroxide is treated with a strong base to produce a filtrate containing soluble plumbate ion in the case where the ore contains lead.

4. A method as in claim 3 wherein the pH in step (b) on addition of ammonia is in the range of 8 to 10.

5. A method as in claim 2 wherein the cyanide is a sodium cyanide or potassium cyanide.

6. A method as in claim 1 wherein the partitioning means is a porous membrane.

7. A method as in claim 6 wherein the membrane is formed of sintered ceramic.

8. A method as in claim 7 wherein the membrane contains pores having diameters not over 35 microns.

9. A method as in claim 1 in which the ion complex in step (a) comprises cuprous halide (CuX), together with sufficient cupric halide ($CuX_2$) to suppress the evolution of hydrogen sulfide.

10. A method as in claim 9 wherein said complex solution contains from about 0.1 to about 0.6 moles of cuprous chloride per liter of solution and from about 3 to about 6 moles HCl per liter of solution.

11. A method as in claim 2 wherein the thiosulfate is an alkali metal thiosulfate.

12. A method as in claim 9 wherein the concentration of hydrogen halide in the cuprous halide complex solution is at least 3N.

13. A method as in claim 1 wherein the strong base in step (c) is chosen from alkali metal hydroxides and strongly alkaline amines.

14. A method as in claim 13 wherein the strong base is chosen from sodium hydroxide and diethylamine tetramine.

15. A method as in claim 1 wherein an electric current is passed through the solution of cuprous halide complex ion and aqueous hydrogen halide in the anode compartment for a suitable induction period before any ore is added, whereby to form a reactive oxidizing agent.

16. A method as in claim 15 wherein the induction time is 5 to 30 minutes.

17. A method as in claim 1 wherein the hydrogen halide is hydrogen chloride.

18. A method as in claim 17 wherein the copper halide is at least predominantly copper chloride.

19. A method as in claim 1 further comprising separating the solution from step (b) and treating it with copper metal to precipitate metallic silver.

20. A method as in claim 1 further comprising treating the filtrate from step (c) with carbon dioxide to precipitate lead carbonate ($PbCO_3$), separating the precipitate and heating it to produce lead oxide, and heating the oxide to produce lead.

21. A method as in claim 1 wherein the pH in step (c) on addition of strong base is in the range of 12 to 14.

22. A method as in claim 1 further comprising recycling the filtrate from step (b) containing any electrolyzed zinc in the form of zinc ions, into the cathode compartment and depositing the zinc as zinc metal.

* * * * *